United States Patent
Hayes

[15] 3,637,318
[45] Jan. 25, 1972

[54] DRILLING APPARATUS
[72] Inventor: Richard H. Hayes, Tallmadge, Ohio
[73] Assignee: Eagle-Picher Industries, Inc., Cincinnati, Ohio
[22] Filed: July 22, 1969
[21] Appl. No.: 843,673

[52] U.S. Cl. ................................................408/11, 408/17
[51] Int. Cl. .................................................B23b 47/24
[58] Field of Search .....................77/32.4, 32.7; 408/11, 17

[56] References Cited

UNITED STATES PATENTS

| | | | |
|---|---|---|---|
| 3,418,549 | 12/1968 | Emerson et al. | 77/32.7 UX |
| 3,259,023 | 7/1966 | Rieger et al. | 77/32.7 X |
| 2,418,387 | 4/1947 | Zarobsky | 77/32.7 X |
| 2,260,327 | 10/1941 | McKee | 77/32.4 |

Primary Examiner—Francis S. Husar
Attorney—Teare, Teare & Sammon

[57] ABSTRACT

A drilling apparatus for drilling holes of predetermined depth in a workpiece including a drill head assembly disposed for angular orientation with respect to the workpiece. The assembly comprises a drill mechanism including a powered drill bit with controls for automatically controlling rotational speed of the bit. The drill mechanism is moved axially into and out of engagement with the workpiece by a drill control mechanism including a fluid motor unit with controls for automatically controlling the feed rate of the bit, such as rapid forward feed, intermediate forward feed, reduced constant cutting feed and rapid retraction feed, in each cycle, and with the cycle length and duration automatically determined in accordance with load forces, such as chip load or the like, on the bit.

25 Claims, 19 Drawing Figures

INVENTOR
RICHARD H. HAYES
BY
Teare, Teare & Sammon
ATTORNEYS

INVENTOR.
RICHARD H. HAYES
BY

ATTORNEYS

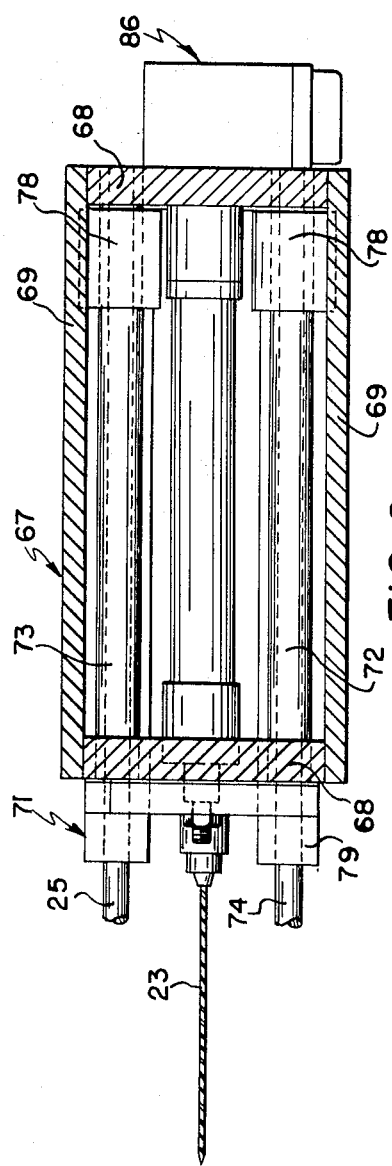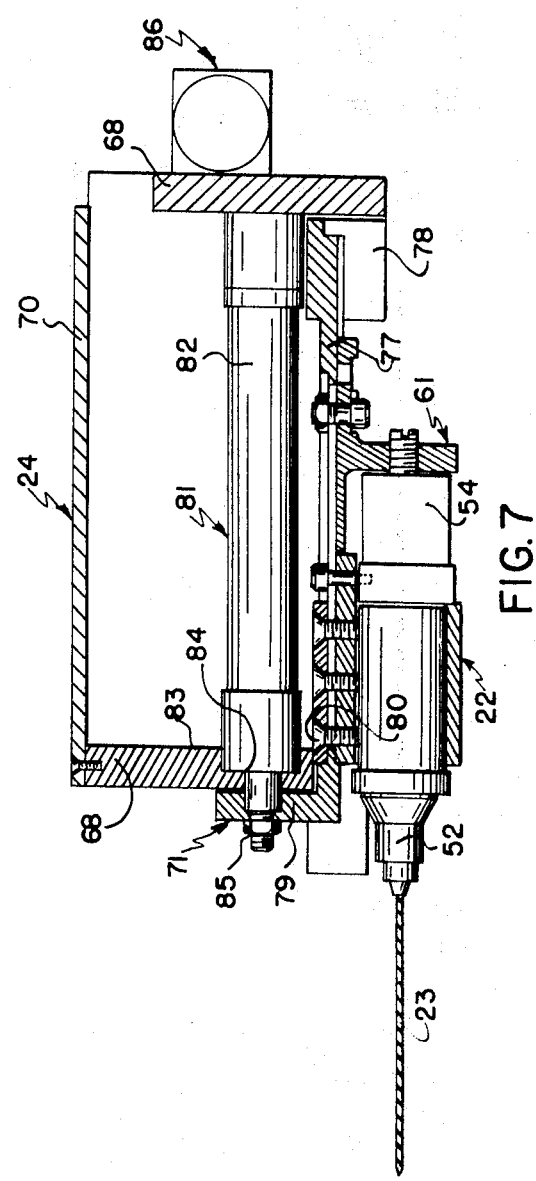

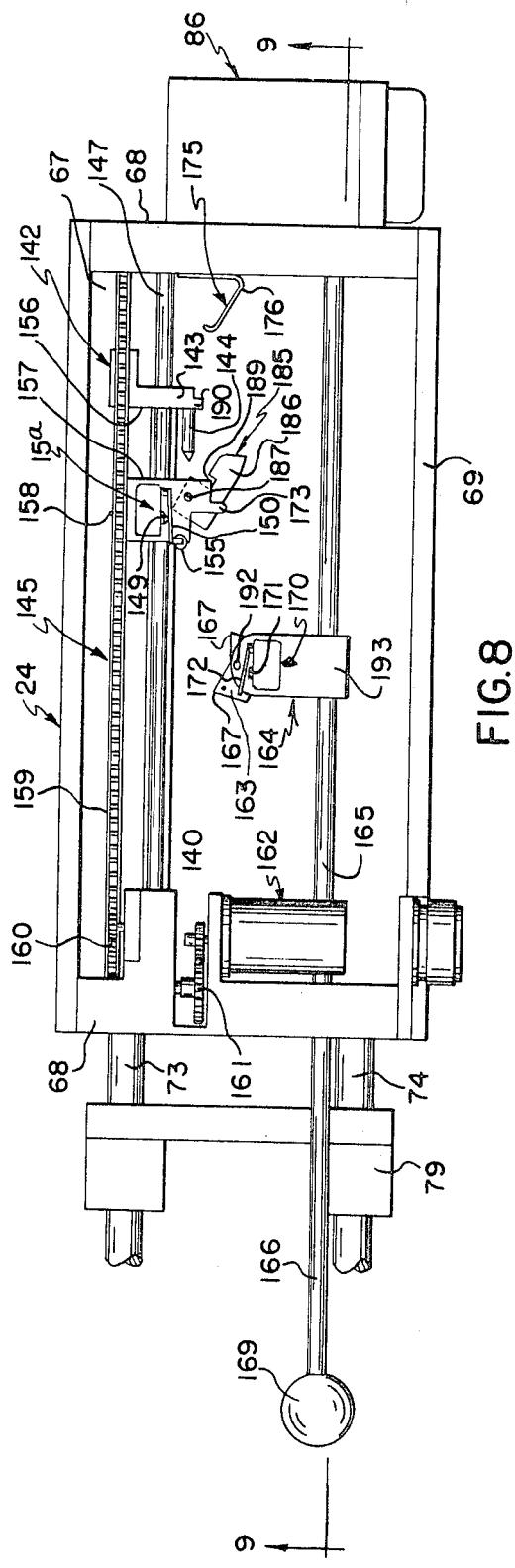

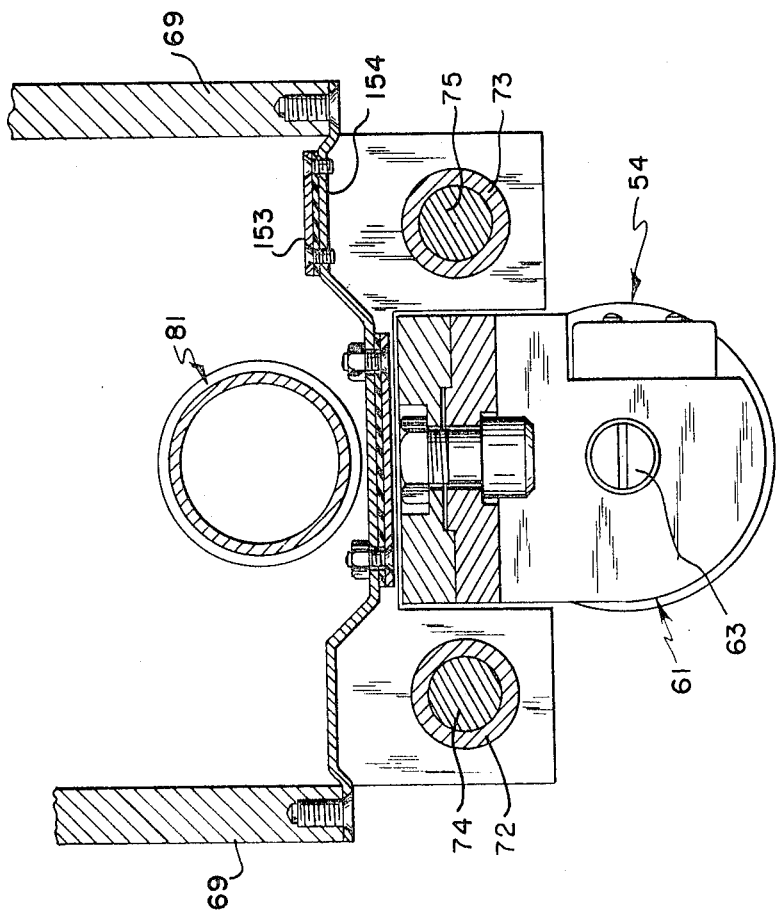

INVENTOR.
RICHARD H. HAYES
BY
Teare, Teare & Sammon
ATTORNEYS

DRILLING APPARATUS

BACKGROUND OF THE INVENTION

The present invention relates to drilling apparatus, and more particularly to an apparatus for automatically drilling small diameter and relatively deep holes in a workpiece, such as in the venting of metallic tire molds or the like.

Heretofore, the drilling of holes having a diameter of the order of one-sixteenth of an inch in a metallic workpiece has been an appreciable problem, particularly where such holes are relatively deep, such as 6 to 8 inches in depth. In drilling operation, the chip buildup causes the drill bit to bind in the hole resulting in breakage of the drill bit. Consequently, the drill bit must be repeatedly withdrawn at the proper time, the chips removed and the drill reinserted. However, premature withdrawal of the drill bit greatly increases the drilling time, whereas late withdrawal results in breaking of the drill bit. These and other problems existed even when the drilling was performed by skilled operators. The work was dangerous for when the drill would break, small fragments would be thrown off causing liability of injury to the operator. Usually, the operator cannot reduce the hazard by slowing down the rate of rotation when a break occurs, because the breakage and consequent explosion of the particles occur before the operator has an opportunity to reduce the drill speed or stop the power. In cases where holes have been drilled from the inside of a workpiece, such as a tire mold or the like, the operator has stood in front of the workpiece and pulled the drill toward himself. In such operations, accidents have occurred when the drill unexpectedly penetrated through the mold with consequent injury to the operator.

Heretofore, still further problems have existed with manual drilling operations. One such problem generally occurred when a man standing outside the mold experienced difficulty in backing the drill out of the hole or the like. Importantly, it was often difficult for the operator to drill a straight or substantially linear hole. About 200 pounds of pressure is usually required to be exerted on the drill bit in order to force the same into the material of a tire mold. In order to achieve such pressure, the operator has generally had to lean against a support or against the workpiece. Such techniques, however, have made it extremely difficult to maintain proper accuracy in hole alignment. As a result, the drilled holes have often had a bend or curve rather than being straight or linear throughout their length, as desired. Moreover, the difficulties and attempts to avoid such problems in drilling straight holes have oftentimes increased the likelihood of drill breakage.

Heretofore, automatic drilling machines have been provided for drilling holes in various metallic materials. However, such machines have not been satisfactory for drilling small-diameter and relatively deep holes in such materials. Generally, either the machines did not retract during the drilling of a hole for chip removal and/or lubrication, or the withdrawal of the drill bit was on a predetermined basis. However, where the retraction was predetermined, it was generally not satisfactory since it was pursuant either to a distance or time cycle. In such cases, the drill bit would be withdrawn when it had drilled a predetermined number of inches or when it had been drilling for a predetermined time. Since it is generally impossible to predetermine the extent of drilling before the drill bit must be retracted, such machines had to be either set for too slow a speed, and too frequent withdrawal, or they resulted in excessive drill breakage. Not only is there variation from hole to hole for the distances at which the drill must be removed, but there is also a variation in the number of times the drill bit must be removed. The distance a drill bit can travel before removal depends on many factors. These factors include, for example, the nature of the metallic material at the hole location, lubrication of the drill bit, sharpness of the drill bit, etc. As a result, the drill bit, in the automatic drilling machines, had to be repeatedly withdrawn prematurely, thereby increasing the drilling time with consequent wasting of lubricant and/or cooling material, or the drill bit would not be withdrawn soon enough, thereby causing excessive breakage. As a consequence, the skilled operator, even with the aforementioned and other difficulties, still remained the most reliable and expeditious method for drilling relatively deep, small-diameter holes.

SUMMARY OF THE INVENTION

A drilling apparatus for drilling one or more holes in a workpiece by one or more random cycles of indeterminate duration or length comprising, a frame for mounting said workpiece and for supporting a drill head assembly for angular orientation with respect to said workpiece. The assembly includes a drill mechanism having a powered drill bit and control means for automatically controlling the rotational speed of said bit. A drill control mechanism is attached to said drill mechanism and includes a fluid motor means for moving said drill mechanism relatively to said drill control mechanism and for moving said drill bit axially into and out of engagement with said workpiece. A control system coacts with said drill control mechanism and said fluid motor means for automatically and sequentially controlling the feed rate of said bit, such as by a rapid forward feed—intermediate forward feed—reduced constant cutting feed—and rapid retraction feed, for a given cycle of operation in response to force load variations on said drill bit.

The apparatus further includes a bracket assembly for pivotally mounting the drill head assembly with respect to said frame for selectively angularly orienting the drill bit with respect to said workpiece. Powered means are mounted on the frame for vertically raising and lowering said drill head assembly with respect to said workpiece, and tablelike means are mounted on said frame for rotatably supporting said workpiece with respect to said drill head assembly. A drill bit servicing means coacts with the drill head assembly to cool and/or lubricate said drill bit and/or to remove chips or the like therefrom during axial movement thereof with respect to said workpiece.

By the foregoing arrangement, the drill bit is caused to travel axially at a maximum rate until just prior to contacting the workpiece, at which point it automatically slows to a reduced intermediate or preimpact rate. Shortly after impact with the workpiece, the bit slows automatically to a substantially constant axial feed rate for cutting the workpiece. The bit continues at this substantially constant cutting rate until force load variations are imparted thereto, such as due to chip buildup, wear or the like, whereupon, the drill bit is automatically retracted, cleaned, cooled or lubricated, and then recycled. By this arrangement, the depth of travel of the drill bit prior to each retraction thereof is maintained at a maximum while the drilling time is maintained at a minimum with a substantially constant cutting rate being maintained throughout the drilling operation. Accordingly, drill breakage is greatly reduced, and in most cases, eliminated with the capability to drill holes more rapidly and straighter than can be achieved by heretofore known apparatus, yet without consequent danger to the operator or others in the work area.

In addition, the drill head assembly is of a small and compact, yet rugged construction with long stroke capacity for operation in confined areas. The assembly is of a lightweight and highly sensitive construction with extremely long-life features, minimum wear and maintenance ease for high-production use. The assembly is of a self-contained construction capable of handling very small diameter drills, such as 1/32-inch to 3/16-inch diameter, to substantial depths, such as to 8 inches, with substantially automatically controlled feed rates. Also, the assembly adjusts to torque requirements of selected drill size and materials and adjusts to pressure requirements, and further adjusts automatically to the desired cutting depth.

BRIEF DESCRIPTION OF THE DRAWINGS

FIG. 6 is a horizontal section view taken along the line 6—6 of FIG. 5 with parts cut away for purposes of clarity;

FIG. 7 is a vertical section view taken along the line 7—7 of FIG. 3, with parts removed for purposes of clarity;

FIG. 8 is a fragmentary top plan view showing the interior of the drill head control mechanism with parts removed for purposes of clarity;

FIG. 9 is a vertical section view taken along the line 9—9 of FIG. 8;

FIG. 10 is an enlarged fragmentary vertical section view taken along the line 10—10 of FIG. 5;

DESCRIPTION OF THE PREFERRED EMBODIMENTS

Figure 1:
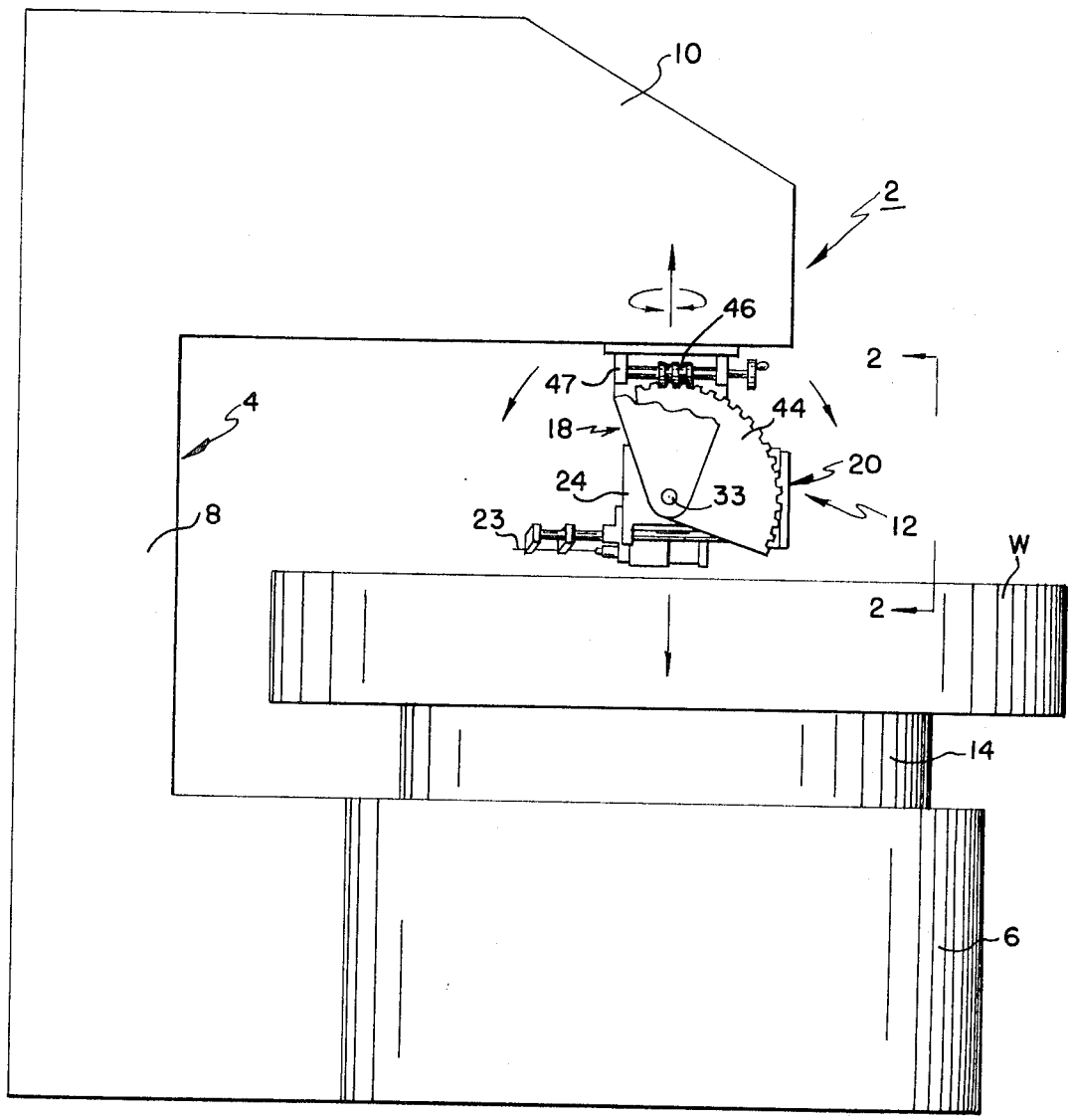
FIG. 1 is a side elevation view of the drilling apparatus mounting a drill head assembly in accordance with the invention.
Figure 2:
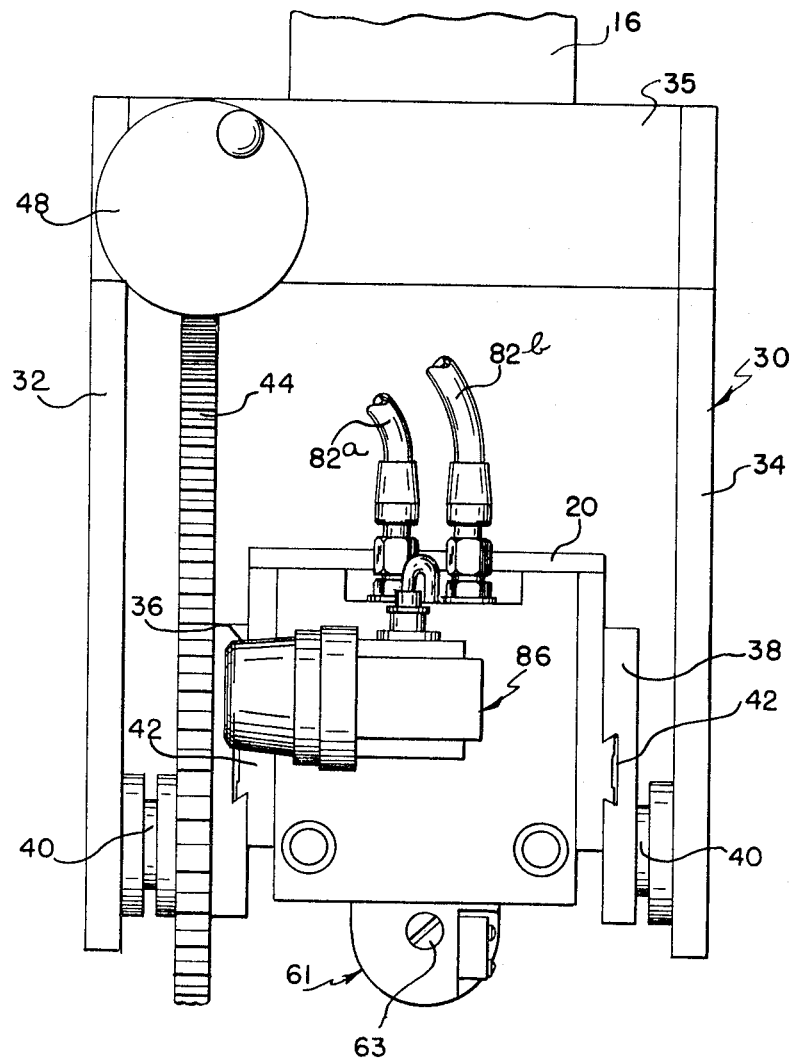
FIG. 2 is an enlarged fragmentary front elevation view looking in the direction of the line 2—2 of FIG. 1.

In general, and with reference to FIG. 1 of the drawings, there is illustrated the drilling apparatus 2 of the invention for drilling one or more holes in a workpiece W, such as in the venting of a metal tire mold or the like. As shown, the apparatus 2 includes a frame 4 having a base 6, an upstanding pedestal 8 and a cantilevered crossarm 10 for supporting a drill head assembly 20 above the workpiece. The base 6 mounts a rotatable support table 14 so that the workpiece can be selectively rotated about a vertical axis with respect to the drill head assembly 20. The drill head assembly 20 is mounted to depend from the crossarm 10 by a support column 16 (FIG. 2) so that the assembly can be selectively raised and lowered in a vertical direction toward and away from the workpiece. The assembly 20 is mounted on the column 16 by a bracket assembly 18 so that the drill head 20 thereof can be selectively tilted about a horizontal axis (shown by the arrows) for drilling holes angularly in the workpiece.

The drill head assembly 20 generally comprises a drill mechanism 22 and a drill control mechanism 24 supported, as a unit, from the bracket assembly 18. The mechanism 22 includes a rotatable speed controlled drill bit 23 and is mounted below and adapted for reciprocal axial movement with respect to the drill control mechanism 24 for selectively controlled feed axially toward and away from the workpiece W. The drill control mechanism 24 includes mechanical and electromechanical control components for automatically controlling rotational (drill speed) and/or axial (drill feed rate) movements of the drill bit 23 with respect to the workpiece W in response to force load variations, such as chip load or the like, on the bit, as will be described hereinafter.

In operation, for example, the drill mechanism 22 for a given drilling cycle has a controlled sequential feed rate, such as a rapid forward feed—intermediate forward feed—reduced cutting feed—and rapid retraction feed, with such cycle automatically repeated for the next successive drilling operation. The term cycle, as employed herein, shall mean the sequential steps for completion of the drilling operation for a hole to be drilled to a given depth.

By the foregoing arrangement, a plurality of small-diameter holes may be precisely and efficiently drilled to a given depth in a workpiece. More specifically, in the invention a given hole depth may be achieved by a predetermined incremental removal of stock so that as the drill bit 23 penetrates into the workpiece the amount of cutting depth per cycle decreases (i.e., stock to be removed) while the noncutting depth increases. Accordingly, in the invention the actual cutting feed (i.e., reduced forward feed) is maintained at a substantially constant rate while certain of the noncutting feeds (i.e., rapid forward and retractive feeds) are maintained at a maximum rate for a given cycle.

In the embodiment shown, the bracket assembly 18 includes a generally U-shaped bracket 30 (FIG. 2) having a pair of oppositely disposed sidearms 32 and 34 connected together by a baseplate 35 which, in turn, may be connected to the support column 16, as by weldments or the like. The drill head assembly 20 is preferably mounted between the sidearms 32 and 34 for pivotal movement about a horizontal pivot axis 33 (FIG. 1) by a pair of oppositely disposed sideplates 36 and 38 which may be journaled for rotation, as at 40, to the respective sidearms 32 and 34. The assembly 20, in turn, may be removably attached to the sideplates 36 and 38 by means of keyways 42. Pivotal movement may be imparted to the assembly 20 by means of a segment gear 44 fixedly attached to one of the plates, such as 36, so as to be disposed for meshing engagement with a worm gear 46 (FIG. 1) rotatably mounted on the column 16 by suitable brackets 47. The gear 46 may be driven, such as by a manual handle 48, or a suitable motive power (not shown), for selectively angularly orienting the drill bit 23 with respect to the workpiece.

As best seen in FIGS. 3 to 7, the drill mechanism 22 includes a fluid-actuated, such as pneumatic, motor unit 50 having a chuck 52 for removably mounting the drill bit 23. Rotational movement may be imparted to the motor unit 50 via conduits 53 from a source of pressurized fluid, such as an air compressor or the like, (not shown). The motor 50 and the compressor therefor may be controlled by solenoids 321 and 335 (FIG. 15) for regulating the rotational cutting speed of the bit 23. For example, a low and high speed can be imparted to the drill bit, such as 10,000 r.p.m. and 20,000 r.p.m., as desired.

Figure 5:
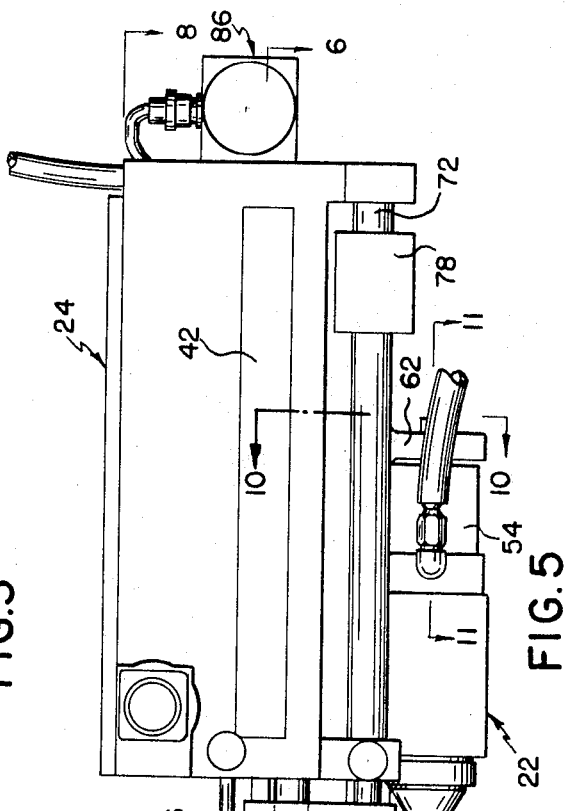
FIG. 5 is a fragmentary side elevation view of the drill head assembly of FIG. 3.
Figure 4:
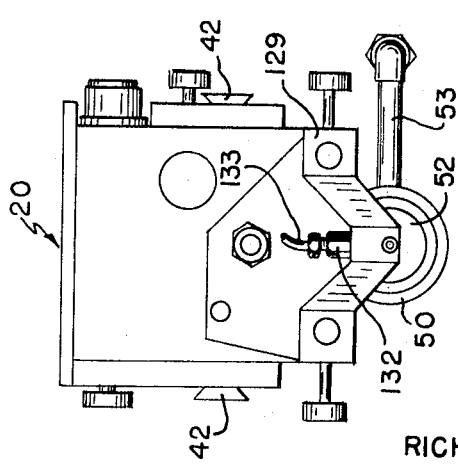
FIG. 4 is an end view looking from the left-hand side of FIG. 3.
Figure 11:
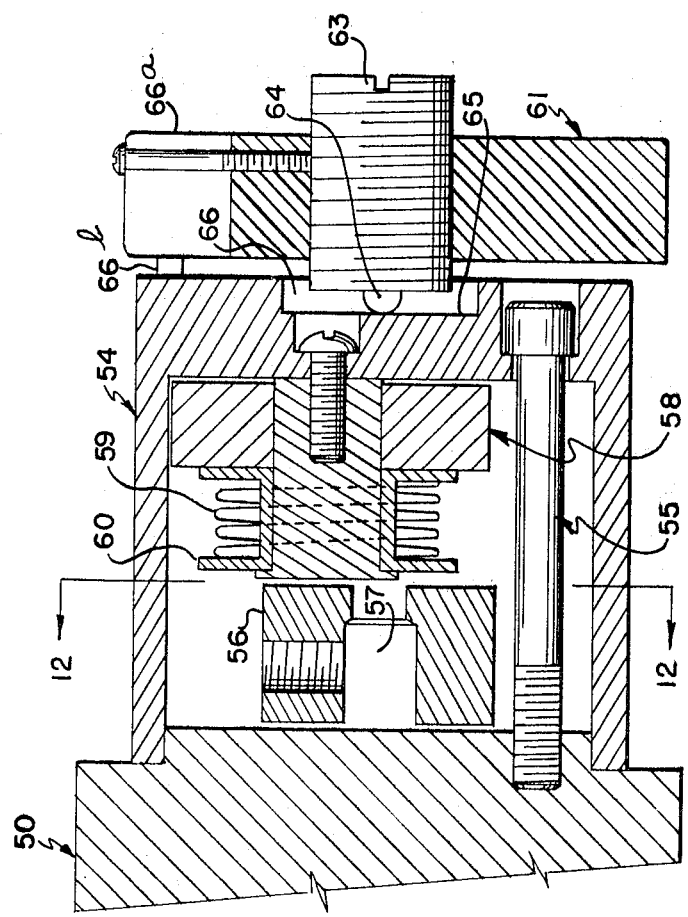
FIG. 11 is an enlarged fragmentary horizontal section view taken along the line 11—11 of FIG. 5.
Figure 12:
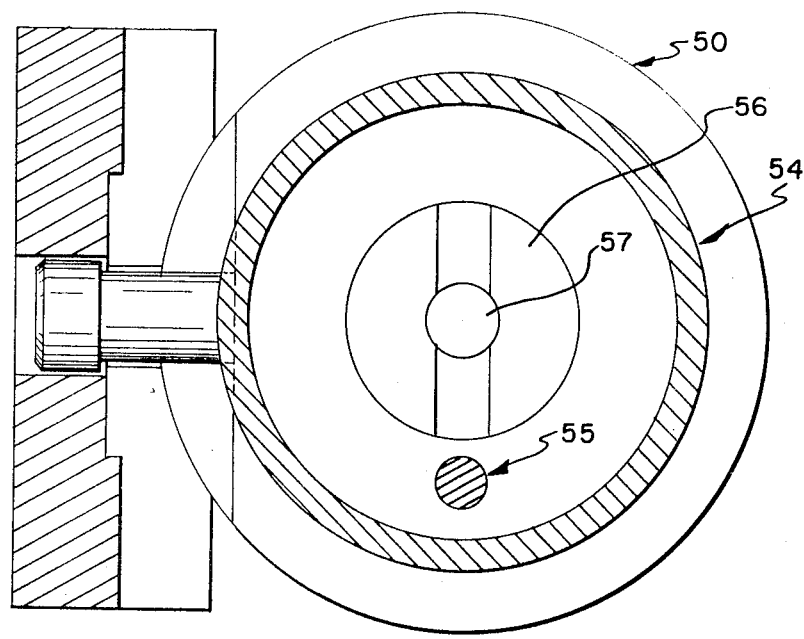
FIG. 12 is a vertical section view taken along the line 12—12 of FIG. 11.

As best seen in FIGS. 5, 11 and 12, the rotational speed of the motor unit 50 may be sensed by a sensing unit 54, such as an AC tachometer to provide a signal for retraction of the drill bit 23 upon excessive load force thereon. The unit includes a housing 55 attached to the motor unit 50 and is preferably in the form of a generator having a rotor 56, such as magnet or the like, attached to one end of the drill bit, as at 57. The rotor 56 is spaced from the stator 58 which includes a field coil 59 disposed around a spool 60 attached interiorly of the housing 55 so that upon rotation of the bit 23 and hence, the rotor 56, the magnetic field generated produces an electrical voltage output which corresponds proportionately to the rotational speed of the bit. By this arrangement, when the output voltage from the generator drops below a predetermined value, an output signal is produced for automatically retracting the bit 23, as will be described hereinafter.

In the form shown, the sensing unit 54 may be provided with a pressure-responsive overload device 61 to cause retraction of the drill bit 23 upon wear or the like thereof. Such device may include a mounting bracket 62 attached to the underside of the drill control mechanism 24 (FIG. 1). The bracket is arranged to threadably receive an adjustment screw 63 which, in turn, mounts a ball plunger 64 which may be spring-biased for engagement with the confronting face 65 of a recessed portion 66 provided in the housing 55. By this arrangement, the device may be threadably preset so that when the back pressure on the drill bit 23 exceeds a predetermined pressure, the ball plunger 64 is depressed to actuate a suitable switch (not shown) in the circuit to automatically retract the bit for sharpening and/or replacement thereof.

The drill control mechanism 24 includes a polygonal, hollow housing 67 having opposed end 68 and side 69 walls (FIG. 6) with a removable top place 70 (FIG. 7) attached, as a unit, to the drill mechanism 22. The sidewalls 69 include the keyways 42 to provide the pivotal connection with the bracket assembly 18. The housing 67 is preferably of an open bottom construction for mounting a slide carriage 71 which supports therebelow the drill mechanism 22 for reciprocal movement of the same with respect to the mechanism 24.

In the invention, the slide carriage 71 includes a pair of parallel, hollow guide rods 72 and 73 which extend between and are fixedly attached to the end walls 68 (FIGS. 8 and 9) of the housing 67. The rods 72 and 73 each slidably receive in telescopic relation therein slide rods 74 and 75 which extend forwardly through apertures, as at 76, in the forwardmost end wall 68. A support plate 77 (FIG. 7) is attached at one end to a pair of rear blocklike yokes 78 which are slidably mounted on the exterior of the guide rods 72 and 73 and at the other end to a common transverse yoke member 79 which extends between and is fixedly attached adjacent the distal ends of the respective slide rods 74 and 75 for reciprocal telescopic movement upon axial movement of the rods 74 and 75 within the rods 72 and 73. The drill mechanism 22, in turn, is detachably mounted in underslung relation below the support plate 77 via suitable fasteners, as at 80, and by the aforesaid bracket 62, as seen in FIG. 7.

In the invention, reciprocal movement is preferably imparted to the slide carriage 71 by means of a fluid motor unit 81 (FIG. 7) disposed generally interiorly of the housing 67 above the support plate 77. The unit 81 is preferably of the double-acting type including a cylinder 82 fixedly attached between the end walls 68 and a piston rod 83 which extends through an aperture, as at 84, in the forwardmost end wall 68 for detachable connection via suitable fasteners 85 to the front yoke member 79. Fluid pressure may be introduced into the cylinder 82 via suitable conduits 82a and 82b from a servo valve mechanism 86 (FIGS. 2 and 5) which may be mounted on the exterior of the rearwardmost end wall 68 for controlling actuation of the motor unit 81 and hence, the reciprocal movement of the drill mechanism 22 with respect to the workpiece W. The servo valve mechanism 86 may be of the two-directional type for varying speed in response to electrical signals and may be of the type, such as made by Champion Manufacturing Company, Cadillac P/N FCIO–624A. In the form shown, the solenoid mechanism 86 includes a spool valve (not shown) which is actuated in response to energization of a solenoid coil 90 (shown diagrammatically in FIG. 13). A suitable pump (not shown) may be provided for introducing fluid under pressure to the mechanism 86 and for establishing fluid exhaust therefrom, as known in the art.

In a preferred form, when the solenoid 90 is energized, the spool valve will move to a full open position to cause the piston 83 to move forward at a high speed, such as 500 inches per minute. For the remaining two forward speeds, the spool valve is selectively partially closed. Thus, a relatively lower energization causes the spool valve to partially close so as to reduce the forward speed of the piston 83 to the preimpact or intermediate speed, such as 10 inches per minute. A further reduction in energization of the solenoid coil 90 acts to cause the spool valve to correspondingly fluctuate in small movement. Since fluctuation in energization of the solenoid coil 90 may occur more readily than corresponding changes can occur in the fluid flow rate, the fluid flow to the motor unit 81 can be maintained at a constant desired low rate, such as 6 inches per minute, for cutting the workpiece. A reverse energization of the solenoid coil 90 will cause the spool valve to move into its neutral position which, in this case, provides a full fluid flow in a reverse direction at a high speed so that the piston 83 and hence, the carriage 71 travel in a reverse direction, such as at 500 inches per minute.

Figure 3:
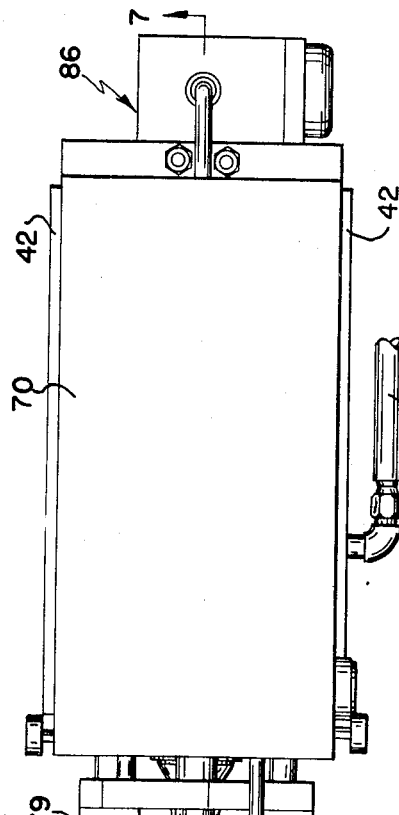
FIG. 3 is a fragmentary top plan view of the drill head assembly removed from the apparatus of FIG. 1.
Figure 15:
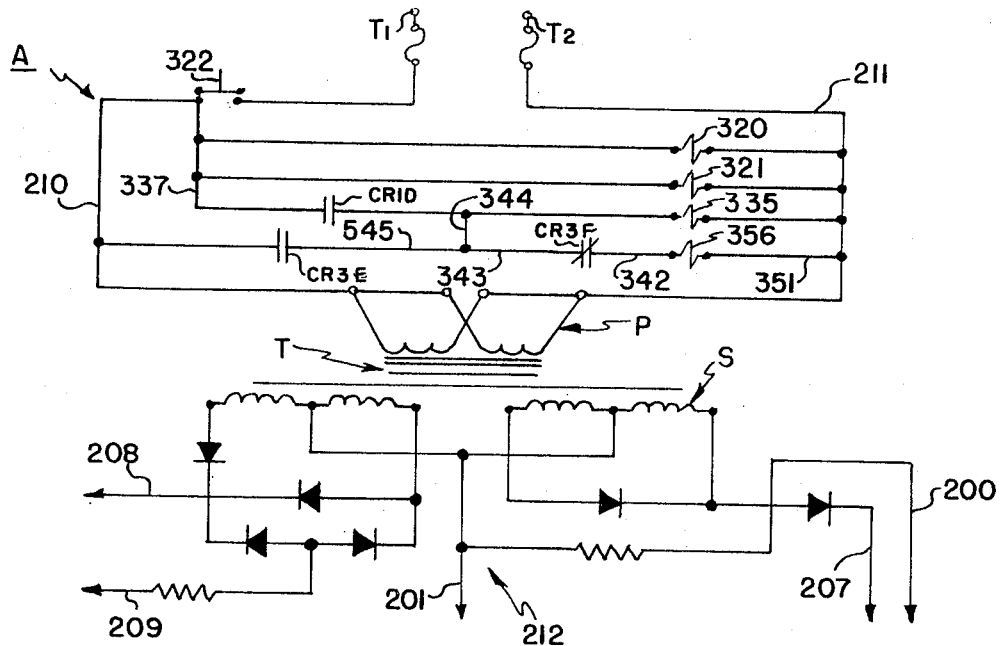
FIG. 15 is a diagrammatic illustration of a further portion of the electrical control circuit for use in the invention.
Figure 16:
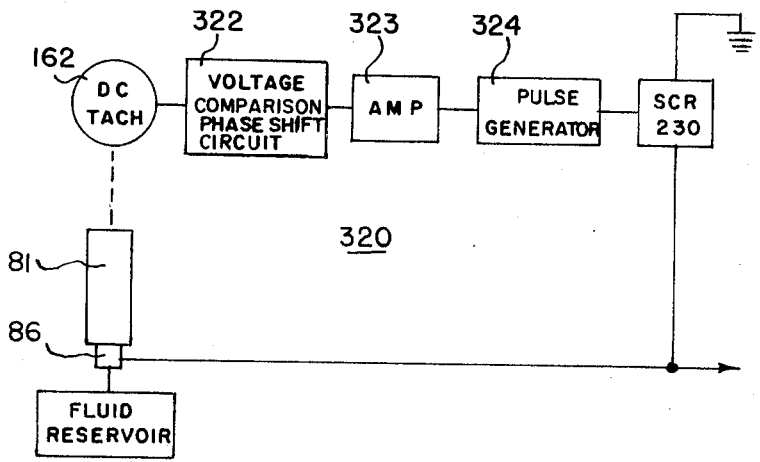
FIG. 16 is a schematic diagram of a typical feedback system which may be used in the invention.
Figure 17:
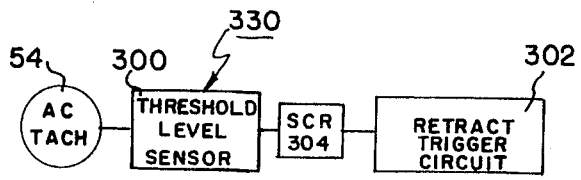
FIG. 17 is a schematic diagram of a sensing system for use in the invention.

A service means 130 may be mounted on the carriage 71 adjacent the drill bit 23 so that a coolant and/or lubricant, such as a mixture of air and oil or the like, may be blown onto the bit at selective portions of the drilling cycles. In the form shown, the service means includes an outer yoke 129 fixedly attached adjacent the distal ends of the slide rods 74 and 75, as best seen in FIGS. 3 and 5. The yoke mounts a sleeve 131 which supports the forward end of the bit 23 and includes an inlet nozzle 132 which supplies the coolant and/or lubricant via a conduit 133 from a suitable supply source (not shown) through a hole (not shown) in the sleeve 131 to the drill bit 23. Flow through the nozzle 132 may be controlled by a suitable solenoid-actuated valve (not shown) which in turn may be controlled by a solenoid 352 (FIG. 15).

In the invention, a drill bit guide device including a second yoke 135 (FIGS. 3 and 5) may be mounted on the slide rods 74 and 75 and generally intermediate the forward yoke 129 and the carriage yoke 79. By this arrangement, the yoke 135 acts to further guide and align the slide rods 74 and 75 and provides an additional support for the drill bit 23.

In accordance with the invention, the drill control mechanism 24 includes a triggering system in the form of mechanical-electrical components for the selective transmission of electrical signals to the control system for sensing and controlling the axial position and/or speed of axial movement of the drill mechanism 22 and for controlling and sensing the cutting action of the drill bit 23.

As best seen in FIG. 9, the triggering system includes a forward trigger device 136 which may be mounted interiorly on one of the end walls 68 of the housing 67. In the form shown, the device may include a limit switch 14a having a fixed contact 137 and a movable contact 138 which may be electrically connected to the control circuit. The switch is preferably mounted in the path of travel of the carriage 71 so that a cam 139 carried thereby actuates contacts 137 and 138 when the carriage is in its rearwardmost retracted position. By this arrangement, the closing of the switch sends a surge of current to actuate fast forward movement of the carriage 71 and hence, the drill mechanism 22 when the carriage is in the retracted position, as will be described hereinafter.

In the form shown, the cam 139 constitutes an extension of another slide rod 140 (FIG. 9) mounted for reciprocal movement within the housing 67. The rod 140 preferably has a length to extend over the trigger device 136 in its fully retracted position thereof. The rod 140 extends at its other end through an aperture 141 in the forward end wall 68 and is fixedly connected adjacent its distal end to the carriage yoke 79 for reciprocal movement upon axial movement of the carriage 71. At one end, the rod 140 mounts a follower device 142 including an upstanding generally L-shaped (FIG. 8) cross-plate 143 which carries a horizontally extending finger element 144. The follower device 142 is fixedly connected at one end to a drive mechanism 145 and is disposed with the finger element 144 for coacting pushing engagement with respect to a position indicator 146 upon actuation of the drive mechanism 145.

In the form shown, the position indicator device 146 is slidably mounted on another rod 147 which is disposed above (FIG. 9) the slide rod 140 and may be fixedly connected between the respective end walls 68 of the housing 67. Such device is preferably of an inverted L-shaped construction (FIG. 8) adapted to be axially slid upon the rod 147 upon abutting engagement by the follower device 142. The device 146 includes a movable contact element 148 adapted to be engaged by the finger element 144 so as to close a limit switch 15a for actuating the control circuit for selective movement of the carriage 71 and hence, the drill mechanism 22. The switch 15a may include a fixed contact 149 and a movable contact 150 connected to a depending angularly oriented contact finger 152 (FIG. 9) which rides along a conductor bar 153 mounted on a support plate 154 which is fixedly connected to and extends between the respective end walls 68 of the housing 67. The bar 153 may be connected by suitable conductors (not shown) with a portion of the control circuit which initiates the preimpact or intermediate forward speed of the carriage the preimpact The movable contact 150 may be in the form of a leaf spring having a roller-type cam 155 mounted on the end thereof. The cam 155 is preferably disposed in the path of the finger element 144 of the follower device 142 so that as the finger element moves internally of the position indicator 146, the contact of the finger with the cam closes the circuit which initiates the preimpact or intermediate slow speed of the drill mechanism 22. Preferably, the length of the finger element 144 is determined so that when the switch 15a is closed by the contact between the finger 144 and the cam 155, an approximately ⅛-inch space exists between the inner surface, as at 156, of the follower device 142 and the mating surface, as at 157, of the position indicator device 146.

In the invention, the position indicator device 146 provides a drive for the drive mechanism 145. As shown, the device includes a connecting pin 158 which is fixedly attached to an endless drive element 159, such as a link chain or the like, which may be trained around (FIG. 8) freely rotatable sprockets 160, (only one shown), which may be journaled within the housing 67. The element 159 may be connected through suitable gearing, as at 161, to the input end of a sensing device 162, such as an AC tachometer. The gearing is correlated so as to be proportional to the linear rate at which the follower device 142 moves the indicator device 146 and hence, the drive element 159 in a forward direction. Preferably, the fit between the position indicator 146 and the rod 147 upon which it slides should be sufficiently tight so that when the carriage 71 is retracted, the device 146 will remain at the position to which it was moved by the follower device 142 prior to retraction thereof. By this arrangement, the position indicator device 146 serves as a relatively fixed memory means which will act to initiate the preimpact or intermediate reduced speed of the drill mechanism 22 at a distance approximately one-eighth of an inch from the undrilled material of the workpiece W.

In the invention, means are provided for automatically determining that the drill bit 23 has completed drilling of a given hole to a predetermined depth. This may be accomplished by a depth-limiting device 164 which may be preadjusted axially of the housing 67. Contact of the position indicator 146 with the device 164 produces a signal which indicates that the desired hole depth has been reached. The device 164 may be slidably mounted on a pair of guide rods 165 (FIG. 9) which are fixedly mounted between the end walls 68 of the housing 67. A push rod 166 is attached at one end to the device 164 and extends toward its other end through a bushing 168 provided in the forward wall 68 of the housing. A knob 169 may be provided on the end of the rod to provide a manual actuation therefor. Suitable indicia (not shown) may be disposed along the rod for predetermining the desired hole depth.

In the form shown, the depth-limiting device 164 may include a switching means 170 (FIG. 8) having a fixed contact 171 and a movable contact 172 which may be connected by conductors (not shown) to the control system for indicating that a hole has been drilled to the desired depth. The contact 172 may be in the form of a leaf spring which is laterally disposed relative to the position indicator 146, whereby when the depth-limiting device 146 is disposed generally opposite the device 164, a projecting camlike element 173 on the device 146 will close the contacts 171 and 172 of the device 164.

In the invention, means may be provided for automatically returning the position indicator device 146 from its relatively set position, as determined by the depth-limiting device 164, for drilling the next successive hole in the workpiece W. This may be accomplished by tapered camlike projections 163 on the device 164 (FIG. 8) which coact with a latch mechanism 185 on the device 146. The mechanism 185 includes a latch plate 186 pivotally mounted, as at 187, on the body 168 of the device 146 and includes a notch portion 189 adapted to receive in interlocking relation therein a projection 190 on the follower device 142. The latch plate 186 may be spring-biased to hold the same in the nonlocking position, as seen in FIG. 8. A spring-loaded overcenter snap device 163 is pivotally mounted, as at 192, on the body 193 of the device 164 including projections 167 so that the latch plate 186 may be pivoted, such as in a counterclockwise direction for interlocking engagement with the projection 190 upon engagement with the projections 167. By this arrangement, upon retraction of the carriage 71 and hence, the drill mechanism 22, the position indicator device 146 is moved, as a unit, with the follower device 142 to the initial starting position for the next drilling operation.

An unlatching device 175 in the form of a resilient generally V-shaped hook member 176 may be provided to uncouple the follower device 142 from the position indicator device 146. The hook member 176 may be mounted on one of the end walls 68 of the housing (FIG. 8) and in the path of travel of the device 146 so that it may engage and strip the latch plate 186 in a clockwise direction from its interlocking engagement with the projection 190 on the follower device 142.

In the invention, it is to be understood that more than one drill head assembly 20 may be employed for independent or simultaneous drilling operations with respect to the workpiece. For example, a pair of drill head assemblies may be mounted on opposed sides of the support column 16 for independent or simultaneous drilling operations. Accordingly, it is contemplated that any number of such assemblies may be employed in the invention, as desired.

ELECTRICAL CIRCUIT

Referring now to FIGS. 13 through 19, there is illustrated electrical circuitry adapted for varying the operation of the mechanism 86, and more specifically, for controlling the flow of current through the servo valve solenoid coil 90.

The electrical circuitry includes a main power circuit A (FIG. 16), a primary control circuit B (FIG. 13) adapted for selectively controlling the flow of current through the servo valve solenoid coil 90, and a secondary control circuit C (FIG. 14) which is operably connected to the primary control circuit to provide electrical signals for selective energization of the components therein, thus control the rate and direction of axial movement of the carriage 71.

Referring now to FIG. 15, the primary power circuit includes terminals T1 and T2 which may be connected across a suitable source of electrical power, such as 440 volts AC. The terminals T1 and T2 may be connected to the primary P of a suitable stepdown power transformer TT1 by means of conductors 210 and 211, respectively. The secondary S of the power transformer PT2 may be connected to the primary control circuit B and secondary control circuit C through suitable rectifying means, illustrated generally at 212 for supplying controlled DC power to such circuits. The primary control circuit may be connected to the secondary of the power transformer PT2 by means of conductors 201, 207 and 200 while the secondary control circuit C may be connected thereto by conductors 208, 209 and 201 with conductor 201 being common to both the primary control circuit B and the secondary control circuit C.

Figure 13:
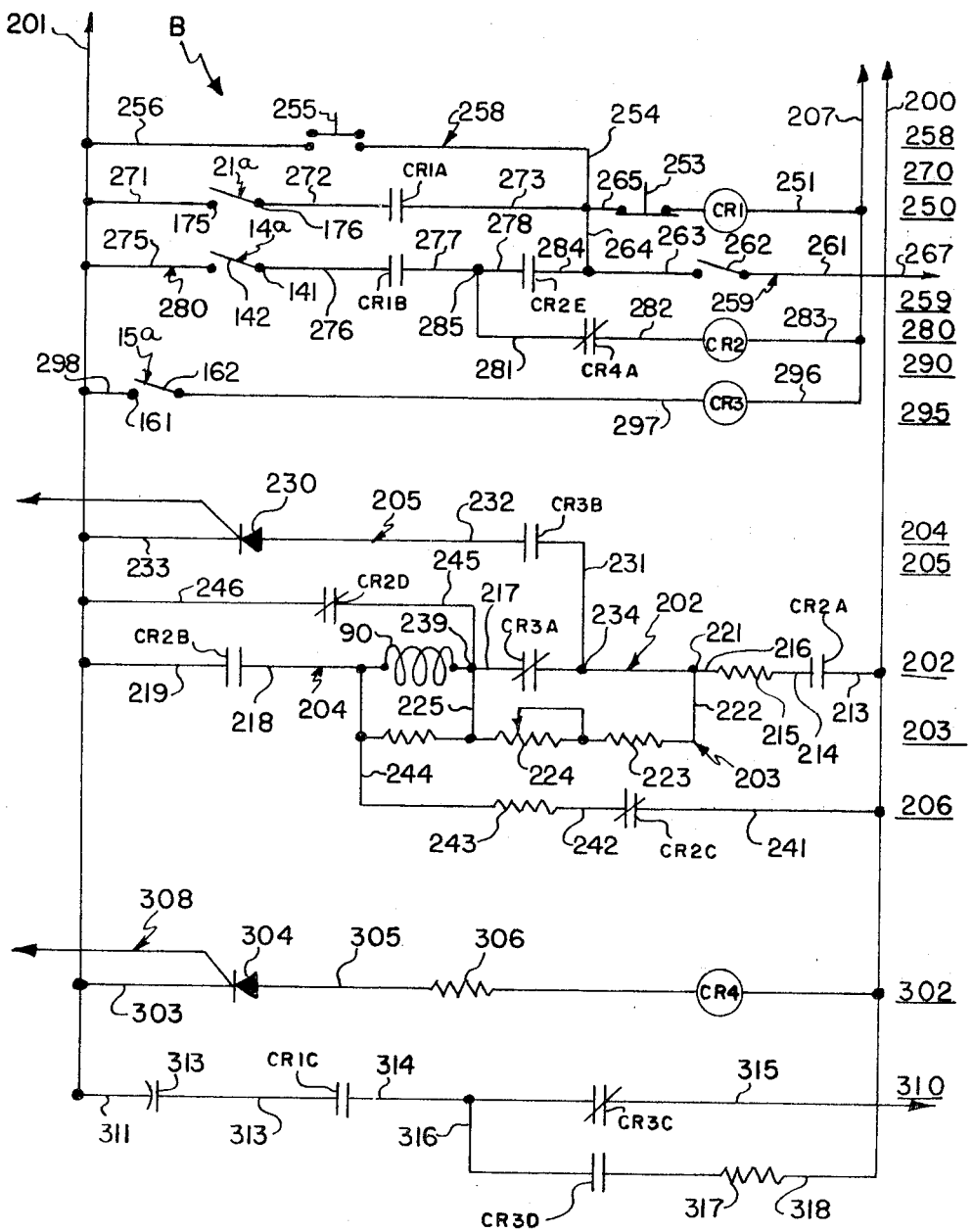
FIG. 13 is a diagrammatic illustration showing a portion of a typical electrical control circuit for use in the invention.

Referring now to FIG. 13, the primary control circuit B is adapted to selectively vary the direction and magnitude of current flow through the servo valve solenoid coil 90, and includes a plurality of branch circuits designated generally at the right-hand side of FIG. 13. As shown, the primary control circuit B includes a forward rapid-feed circuit 202, a forward intermediate-feed circuit 203, a cutting feed circuit 204, and a retract circuit 206. The cutting feed circuit 204 may be provided with a bypass circuit 205 which selectively interacts with the intermediate-feed circuit 203 to provide a variable low-current flow to the servo solenoid coil 90. By the selective actuation of such circuits, such as by control relays or the like (designated generally as CR), the magnitude and polarity of the magnetizing current to the solenoid coil 90 may be controlled to move the spool valve and thus, regulate the rate and direction of flow to the motor.

In discussing the primary control circuit B, selective reference will be made to various control relays. The relay coils of each control relay will be designated by a numerical suffix, such as CR1, CR2, etc., while the various relay contacts of each control relay will be designated by an additional letter suffix, such as CR1A, CR1B, etc.

The forward rapid-feed circuit 202 is provided to move the carriage 71 forwardly at a maximum feed rate. The forward rapid-feed circuit 202 preferably includes a conductor 213, normally open contact CR2A, conductor 214, resistor 215, conductor 216, normally closed contact CR3A, conductor 217, servo solenoid coil 90, conductor 218, normally open contact CR2B and conductor 219, which connect the servo solenoid coil 90 across the power conductors 200 and 201 when the contacts CR2A, CR3A and CR2B are closed. The total resistance of the forward rapid-feed circuit is sufficiently low, such as 2.5 kiloohms, resulting in a high current flow in a forward direction through the servo solenoid coil 90. By this arrangement, the spool valve will be moved to the full forward flow position so that fluid flows into the fluid motor 81 at a maximum rate to move the carriage 71 forward at maximum speed, such as 500 inches per minute.

The forward intermediate-feed circuit 203 is provided to feed the carriage 71 forwardly at a preimpact rate which is relatively less than the forward rapid rate. As shown, the forward intermediate-feed circuit 203 includes conductor 213, normally open contact CR2A, conductor 214, resistor 215, conductor 216 as far as the junction 221, conductor 222, resistor 223, variable resistor 224, conductor 225, servo solenoid coil 90, conductor 218, normally open contact CR2B, and conductor 219, which connect the servo solenoid coil 90 across the power conductors 200 and 201 when contacts CR2A and CR2B are closed and contact Cr3A is open. The effective resistance of this circuit is sufficiently high to cause a relatively low current flow through the servo solenoid coil 90. For example, the resistors 224, 223 and 215 may have resistance values of 5, 12 and 2.5 kiloohms, respectively, to provide a total resistance of 19.5 kiloohms. The variable resistor 224 is selectively adjustable to provide control of the magnitude of the current in the intermediate-feed circuit, and thus, enable the preimpact feed rate to be preset at a predetermined value. This arrangement will result in a relatively low current flow in a forward direction through the servo solenoid coil 90 causing the spool valve to be biased in a partially open position, and thus, enable fluid to flow into the fluid motor 81 at a relatively slow rate for moving the carriage 71 forward at a slower preimpact rate of 10 inches per minute.

The cutting feed circuit 204, when switched into operation, continually varies the current flow through the servo solenoid coil 90, in response to feedback signals from the secondary control circuit C, whereby the forward movement of the carriage is maintained at a relatively constant slowest speed during cutting engagement of the drill with the metal. The cutting feed circuit 204 includes the intermediate forward feed circuit 203 above described, and a bypass circuit 205 which is adapted to provide a shunting circuit around the servo solenoid coil 90. The bypass circuit includes conductor 231, contact CR3B, conductor 232, silicon-controlled rectifier 230 (hereinafter designated as SCR 230) and conductor 233, which are connected between the power conductor 201 and a point 234 on the conductor 216 between the contacts CR3A and the juncture 221, so that the flow of current between the conductors 200 and 201 in the intermediate forward feed circuit 203 is diverted or shunted around the servo coil 90 when such shunt circuit is switched into operation. Such switching operation occurs when contact CR3B is closed and the SCR 230 is firing. When the bypass circuit 205 is in operation, the timing is such that the magnitude of the average current flow through the servo solenoid coil 90 will be less than the magnitude of the current which had been flowing in the servo solenoid coil when only the intermediate circuit was in operation. In accordance with the invention, the net low current will be a variable having a magnitude during any given time period depending upon the timing and duration of the firing of the SCR 230 which, in turn, is controlled by feedback network 320, which will be discussed in more detail hereinafter. Such arrangement results in a continual "hunting" action causing rapid hunting oscillation of the spool valve to maintain a relatively constant slow rate of flow of fluid into the fluid motor 81, and thus, enable the drill bit 23 to be fed forwardly at a relatively constant slow rate during the cutting operation.

The retract circuit 206 operates to cause the carriage to be retracted from the workpiece. The retract circuit 206 includes conductor 241, normally closed contact CR2C, conductor 242, resistor 243, conductor 244, servo solenoid coil 90, conductor 245, normally closed contact CR2D and conductor 246 which connect the servo solenoid coil 90 across the conductors 200 and 201 in a reverse direction when contacts CR2C and CR2D are closed and contact CR3A of the forward rapid-feed circuit 202 is open. The resistance of the retract circuit 206 is sufficiently low, such as 3 kiloohms, so that a high current flows through the servo solenoid coil 90. This high reverse current flow through the servo solenoid coil 90 causes the spool valve to move to the full reverse flow position. With the spool valve in this position, fluid will flow into the fluid motor 81 in the reverse direction causing the carriage to retract at the same rate as the maximum forward rapid-feed rate, such as 500 inches per minute.

A cycle maintenance circuit 250 may be provided for establishing and maintaining the cycling operation throughout the drilling of each hole. The cycle maintenance circuit 251 includes relay coil CR1, conductor 252, reject relay 253, conductors 265 and 273, normally open contact CR1A, conductor 272, depth limit switch 21A and conductor 271. The cycle maintenance circuit 250 is energized by energization of either the manual start circuit 258 or the tape start circuit 259 which causes energization of relay coil CR1. Energization of relay coil CR1 closes normal open contact CR1A completing the circuit between conductors 207 and 201 when the limit switch 21A is closed. The cycle maintenance circuit will remain energized throughout the drilling operation until the limit switch 21A is opened upon completion of a hole causing deenergization of relay coil CR1 and opening of relay contact CR1A.

The manual start circuit 258 includes conductor 251, relay coil CR1, conductor 252, normally closed manual reject relay 253, conductors 265 and 254, manual start pushbutton 255 and conductor 256. Such circuit arrangement momentarily connects relay coil CR1 across the conductor 207 and 201 when the manual relay switch 253 is closed, and the manual start pushbutton 255 has been momentarily depressed. Similarly, tape actuation of the cycle maintenance circuit 250 arises from the fact that relay coil CR1 is connected in the tape start circuit 259. The tape start circuit 259 includes conductor 261, normally open tape switch 262, conductors 263, 264 and 265, normally closed manual reject switch 253, conductor 252 and conductor 251. By such arrangement, relay coil CR1 is connected between the higher potential conductor 207 and lower potential conductor, as at 267, to cause energization of relay coil CR1 when reject switch 253 is closed and the tape start switch 262 is momentarily closed.

A rapid-feed triggering circuit 280 is provided to control energization of the forward rapid-feed circuit 202. The rapid-feed triggering circuit 280 includes conductor 275, limit switch 14a, conductor 276, contact CR1B, conductor 277 to juncture 285, conductor 281, contact CR4A, conductor 282, relay coil CR2, and conductor 283. By such circuitry, relay coil CR2 is connected across the conductors 200 and 207 and energized upon the closing of limit switch 14a, contact CR1B contact CR4A. Energization of relay coil CR2 closes the contacts CR2A and CR2B in the forward rapid-feed circuit 202 thereby applying a maximum current to the servo solenoid coil 90, as aforesaid. A safety feature is provided in that limit switch 14a can be closed only when the carriage is in the fully retracted position. As a result, forward movement of the carriage 71 cannot commence until the carriage is completely retracted to close the limit switch 14a.

The rapid-feed holding circuit 290 is provided to sustain forward movement of the carriage 71 until retraction of the same is required. The rapid-feed holding circuit 290 comprises a main circuit including conductor 283, relay coil CR2, conductor 282, normally closed contact CR4A, conductors 281 and 278, contact CR2E, conductors 284, 264 and 273, contact CR1A, conductor 272, limit switch 21A and conductor 271. By such circuitry, relay coil CR2 is connected across conductor 201 and 207, and is energized when limit switch 21a and contact CR1A, CR2E and CR4A are closed. Since normally open contact CR2E will not be closed until relay coil CR2 is energized, the rapid-feed holding circuit is interconnected to the rapid-feed triggering circuit 280 at the juncture 285. Upon energization of the rapid-feed triggering circuit, all of the aforementioned contacts are closed with the exception of contact CR2E. Therefore, the rapid-feed holding circuit 290 will continue to be energized until a retract signal is received upon opening of one of the switches of contacts therein. As can be seen, this portion of the rapid-feed triggering circuit including conductor 275, limit switch 14a, conductor 276, normally open contact CR1B and conductor 277 forms a branch circuit for the rapid-feed holding circuit. By this arrangement, the limit switch 14a and relay contact CR1B will be closed when the carriage 71 is momentarily in the fully retracted position thereby causing energization of the relay coil CR2, and thus, close contact CR2E. As the rapid-feed holding circuit 290 is simultaneously energized, when the carriage 71 is in the fully retracted position, the coil CR2 will remain energized through the contact CR2E even though limit switch 14a will open as the carriage 71 moves forwardly.

The intermediate-feed triggering circuit 295 controls the energization of the intermediate forward feed circuit 203. The intermediate-feed triggering circuit 295 includes conductor 296, relay coil CR3, conductor 297, limit switch 15a and conductor 298 which connect relay coil CR3 across the conductors 201 and 207 when the limit switch 15a is closed. The limit switch 15a is closed when the carriage follower finger 144 makes physical contact with the limit switch 15a about one-eighth of an inch before contact of the drill bit 23 with the undrilled metal. Energization of the relay coil CR3 opens a normally closed contact CR3A in the forward rapid-feed circuit 202 thereby directing the current flow to the intermediate-feed circuit 203 to cause the carriage to decelerate to a relatively slow intermediate speed.

A retract triggering circuit 302 is provided to control the energization of the retract circuit 206 and may include conductor 303, silicon-controlled rectifier 304 (hereinafter designated SCR304), conductor 305, resistor 306, relay coil CR4 and conductors 307 which connect the relay coil CR4 between the conductor 201 and 200. Conductor 308 connects the gate of the SCR304 to the secondary control circuit C and is adapted to transmit a signal for firing the SCR304. When the SCR304 fires, the relay coil CR4 will be energized opening contact CR4A in the rapid-feed holding circuit 290 thereby deenergizing relay coil CR2. The deenergization of relay coil CR2 opens contacts CR2A and CR2B in the forward rapid-feed circuit 202 and closed contacts CR2C and CR2D in the retract circuit 206 causing retraction of the carriage in the manner previously described.

Figure 14:
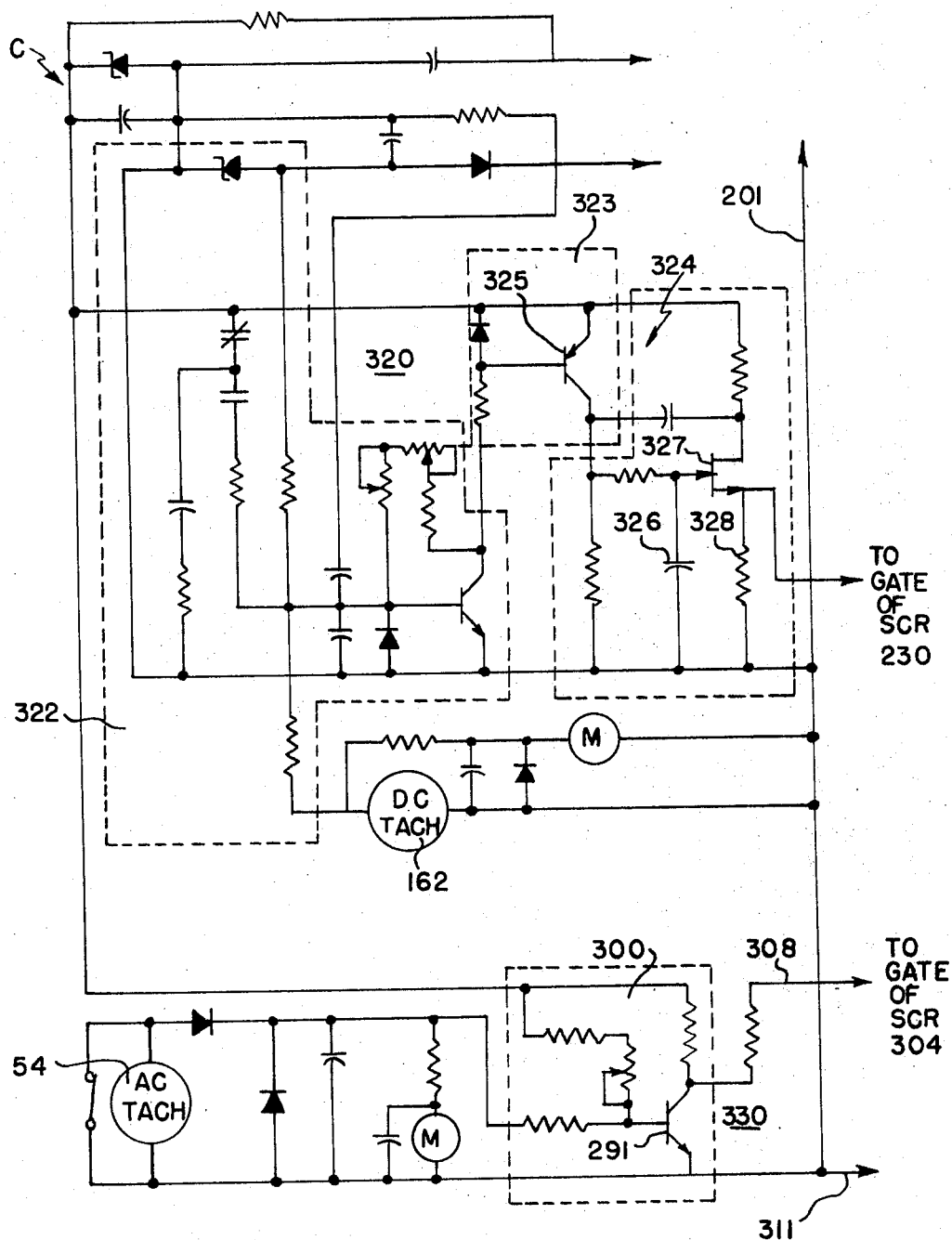
FIG. 14 is a diagrammatic illustration showing another portion of the electrical circuit for use in the invention.

Referring now to FIG. 14, the secondary control circuit C is provided to sense the axial and rotational movements of the drill bit 23 and provide signals for automatically controlling the respective branch circuits of the primary control circuit and to control the movements of the drill bit during cutting engagement with the workpiece. As shown, the secondary control circuit C includes a sensing device 54, such as a DC tachometer, which senses the rate of axial movement of the drill 23 shortly after contact of the drill bit 23 with the metal and a feedback circuit 320 which receives the output of the DC tachometer. Preferably, the feedback circuit includes a comparison circuit 332 which provides an error signal for intermittently firing the SCR230 (FIGS. 14 and 15) to shunt current from the intermediate feed circuit 203 in the manner previously described. By this arrangement, the current flows to the servo solenoid coil 90 is reduced to achieve the desired slow speed. Such intermittent reductions in current flow occur more rapidly than the spool valve can oscillate, thereby resulting in a constant slow speed.

The DC tachometer 162 is driven by carriage follower through chain 159 for sensing the carriage forward speed. Since the voltage output of the DC tachometer 162 is proportional to the axial speed of the carriage, it provides the input for the feedback circuit 320. Such input may be fed, for example, into the voltage comparison circuit 322 wherein the output of the DC tachometer is compared to a reference value. The reference value may be preset at a voltage output of the DC tachometer which corresponds to a given rate of travel of the carriage 71, such as 6 inches per minute. The voltage comparison circuit 322 may be any suitable circuit known in the art, but preferably it is one which, through a suitable amplifier 323 would produce a positive output signal whenever the DC tachometer voltage exceeds the reference value, with the magnitude of the error signal being proportional to the value by which the reference value is exceeded. This output signal may then be fed to a suitable pulse-generating system, as known in the art, such as at 324, which may include a transistor 325, capacitor 326, unijunction transistor 327 and load resistance 328. The load resistance 328 is disposed in the gate circuit of the SCR230, and the SCR230 and the pulse-generating system 324 may be connected to the same rectified nonfiltered power source (FIG. 15). By such an arrangement, when the forward speed of the carriage 71 exceeds the desired rate of 6 inches per minute, the variations in the magnitude of the error signal will cause corresponding variations in the length of the firing time of the SCR230. The longer the SCR230 fires in each voltage cycle, the more current is shunted from the servo valve solenoid coil 90 through the bypass circuit 205, and consequently, the spool valve moved to a more closed position. Such action causes the consequent reduction in the forward speed of the carriage 71 and a corresponding reduction in the output of the DC tachometer 162. When the DC output of the tachometer drops below the reference value, SCR230 is turned off and the full intermediate current flows through the solenoid coil 90 tending to raise the axial speed of the carriage 11. When the output again exceeds the reference value, SCR230 again fires causing the speed to be reduced. By this closed loop "hunting" action, the desired accurate constant slow axial forward speed of the drill is achieved. Once the speed has been reduced to the desired 6 inches per minute, it remains effectively constant during the entire cutting action.

The secondary control circuit C may also be provided with a chip buildup indicating circuit 330 which is provided to operably connect the servo solenoid coil 90 in the retract circuit 206 when the speed of rotation of the drill bit 23 drops below a predetermined value. In the preferred form, an AC tachometer 54 may be provided to sense the rotational speed of the drill bit 23, and the output of the AC tachometer 162 may be fed to a threshold level sensing circuit 300. In the form shown, the threshold level sensing circuit 300 includes a transistor 291 having its collector terminal connected by conductor 308 to the gate of the SCR304 in the retract triggering circuit 302 (FIG. 13). The SCR304 is kept from firing as long as the output of the AC tachometer is above the threshold level and the gate current is below the minimum required value for firing. When the output of the AC tachometer falls below the threshold level, the gate current will be increased sufficiently to cause the SCR304 to fire thereby energizing relay coil CR4 and causing the retract circuit 206 to be energized.

Retraction of the carriage 71 upon completion of the drilling of a hole is initiated by the interlocking of position indicator 146 and depth limit device 164 (FIG. 8) causing the opening of limit switch 21a in the cycle maintenance circuit 250 (FIG. 14), and the consequently deenergization of relay coils CR1 and CR2. The deenergization of such relay coils opens contact CR2A in the forward rapid-feed circuit 202 and allows contact CR2C and CR2D in the retract circuit 206 to return to their normally closed positions thereby connecting the servo solenoid coil 90 in the retract circuit 206 to cause high-speed retraction of the drill carriage.

A hole completion signalling circuit 310 is provided to indicate that a hole has been completed. The hole completion signalling circuit 310 includes conductors 311, capacitor 312, conductor 313, contact CR1C, conductor 314, contact CR3C, and conductor 315. The hole completion signalling circuit 312 also includes conductors 316, contact CR3D, resistor 317 and conductor 318. The branch conductor 311 connects one side of the hole completion signalling circuit 310 to the conductor 201 while the conductor 318 connects the branch circuit to the conductor 200. The branch circuit is interconnected to the conductor 314 by the conductor 316 whereby the capacitor 312 will be charged upon closing of the contacts CR1C and CR3D. The indication that a hole has been completed is initiated by the opening of limit switch 15A when the follower finger 144 is disengaged from the limit switch 15A by the stripping hook 176 which occurs when the carriage is in a full retract position. The opening of switch 15a deenergizes relay coil CR3 in circuit 295 thereby allowing contact CR3C in the hole completion signalling circuit 310 to return to its normally closed position and contact CR3D to return to its normally open position enabling the capacitor 312 to discharge along the conductor 313 which is connected to a signal-sensing device (not shown). Where the machine is adapted for tape initiation of rotation of the worktable 14 for drilling of the next hole, such signal provides the signal to the tape reader to commence the indexing. Since the hole-signalling circuit 310 cannot operate until the carriage 71 has returned to the full retract position to open limit switch 14a, the indexing cannot prematurely begin while the drill bit 23 is in motion or in contact with the work, thus providing a safety feature. In addition, since the relay coil CR1 in the cycle maintenance circuit 250 is deenergized, the carriage 71 will not move forward despite the contact of the cam of the carriage 71 closing limit switch 14a as the forward motion must await the act of deenergization of relay coil CR1 either by tape signal or manual start.

The circuitry for the tape device may be any conventional circuitry which, upon receipt of a signal from the hole completion signalling circuit 310 will generate control signals to cause the motor 23 to rotate the worktable 14 the desired number of preprogrammed degrees for the commencement of the next hole. When the table has been rotated to the proper position, the programmed tape should then transmit a start signal in the tape start circuit 267 to reenergize the relay coil CR1 and recommence the forward rapid-feed of the carriage 71 in the recycling operation, as aforesaid.

Referring again to FIG. 15, the main power circuit A may include operating coils 320 and 321 for starting a hydraulic motor and for operating the drill motor at idling speed, respectively. A high-speed operating coil 335 may be connected across the conductors 210 and 211 when the contact CR1D is closed. Since contact CR1D is closed whenever the contact relay coil CR1 and a cycle maintenance circuit is closed, the high-speed motor is on whenever the cycling operation is in progress, and the motor returned to idling speed while the table is indexed for the drilling of the next hole. The coils 320 and 321 will be connected across the terminals T1 and T2 through conductors 337 and 211 upon depressing of the manual start button 322 while coil 355 requires the contact CR1D to be closed. In addition, the main power circuit may also include a coolant valve actuating circuit 340 which includes conductors 351, coolant solenoid coil 356, conductor 342, normally closed contact CR3F, conductor 343, 344 and 345, normally open contact CR1D, and conductor 337, which connect the coolant valve solenoid coil 356 across the power conductors 210 and 211. The coil 356 is energized when the contacts CR1D and CR3F are closed during the high-speed forward and high-speed reverse motions of the drill bit 25, and therefore, the cooling, lubrication and chip removal occur during such times. The energization of the solenoid coil 356 causes coolant valve (not shown) to open enabling the coolant to be blown on the drill bit 23.

OPERATION

Figure 18:
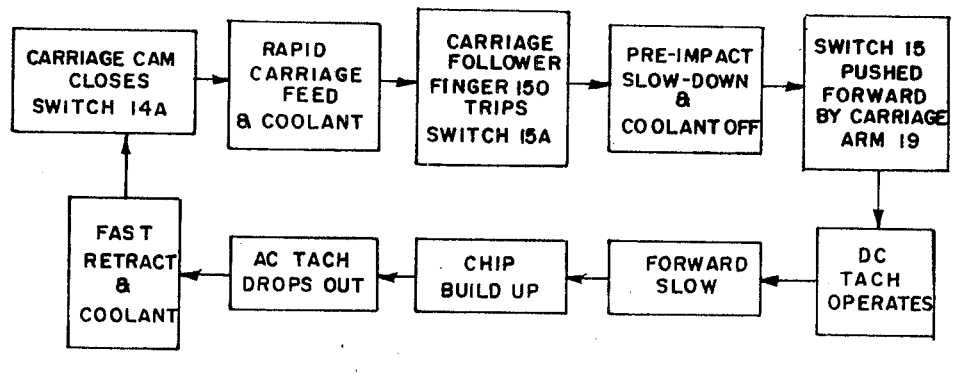
FIG. 18 is a schematic diagram showing the sequence of operation of the drilling apparatus of the invention.
Figure 19:
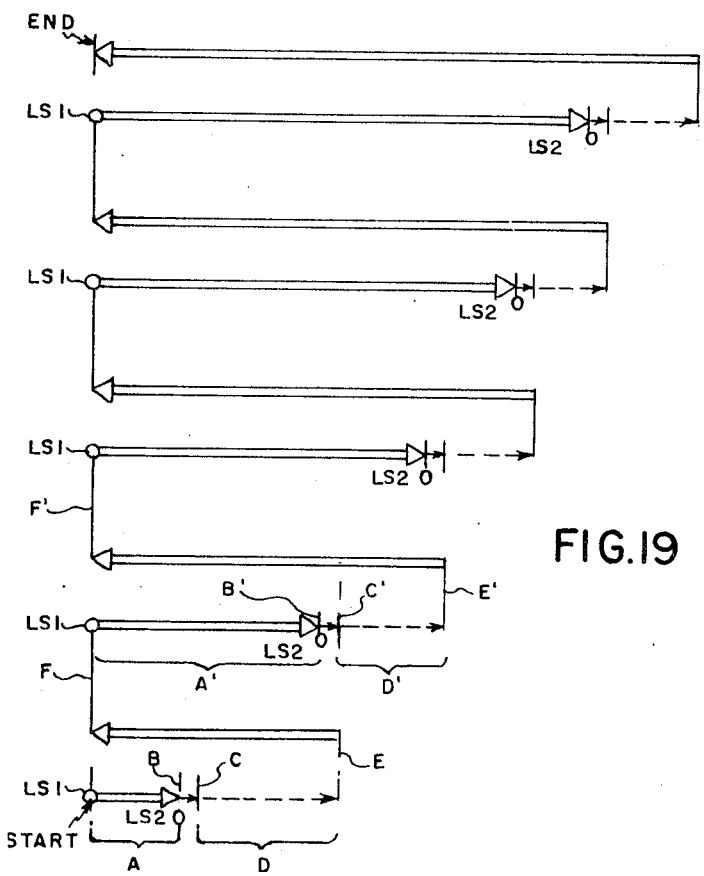
FIG. 19 is a graphic illustration of a typical cycling operation of the drilling apparatus of the invention.

For a typical operation of the drilling apparatus 2, reference may be had to FIGS. 18 and 19 which diagrammatically illustrate the sequence of steps for the incremental drilling of a hole to a predetermined depth in the workpiece W. The workpiece may be mounted on the rotatable support table 14 and the drill head assembly 20 lowered via the column 16 so that the drill bit 23 may be angularly oriented by adjustment of the bracket assembly 18 with respect to the workpiece. The assembly 20 is lowered into the workpiece (i.e., cavity) until the position indicator device 146 is disposed adjacent the area for drilling a hole and the depth limit device 164 (FIG. 8) is adjusted by actuation of the control knob 169. In the case of a fully automatic control operation, a programmed tape having the desired hole pattern and depth may be employed with the apparatus. The operation is commenced by pressing a pushbutton 322 (FIG. 15) which actuates the fluid supply source, such as a hydraulic pump (not shown), so that the drill bit 23 commences rotation and for energizing the power for the various components of the electrical circuit. At such time, the carriage 71 will be in the full retracted position (FIG. 5) or will automatically take such position. A start pushbutton 255 may then be actuated which will energize the cycle maintenance circuit 250 (FIG. 13) which rotates the drill bit 23 at a high speed, such as 10,000 r.p.m., and which actuates the servicing device 130 for delivering coolant and/or lubricant to the bit 23. Since at the start of each cycle the drill mechanism 22 is fully retracted, the cam 139 (FIG. 9) acts to hold switch 14a closed, the holding circuit 290, and the rapid-feed triggering 280. The rapid-feed circuit 202 provides a high current for the solenoid coil 90 to open the servomechanism 86 to actuate the fluid motor unit 81 to move the drill mechanism 22 toward the workpiece W at a maximum feed rate, such as 500 inches per minute, as seen at A in FIG. 20. During this high-speed movement, coolant and/or lubricant is discharged onto the drill bit 23 to lubricate the same and remove any chips therefrom.

The holding circuit 290 maintains the rapid forward motion of the drill mechanism 22 even though the switch 14a opens upon such forward movement. This circuit also maintains forward motion of the drill mechanism 22 during the two subsequent forward speeds and upon being deenergized, for any reason, enables the drill mechanism 22 to be automatically retracted.

As best seen at B of FIG. 19, when the drill bit 23 is approximately one-eighth of an inch from the workpiece W, the intermediate switch 15a is actuated by the finger 144 of the follower device 142 (FIG. 8) which energizes the forward intermediate-feed circuit 203 (FIG. 13) reducing the current in the solenoid coil 90 which causes the spool valve to partially close to reduce the flow to the motor unit 81. This slows the travel of the drill mechanism 22 to a preimpact or intermediate rate, such as 10 inches per minute. Energization of the feed circuit 203 also operates to deactivate the servicing unit 130 for feeding coolant and/or lubricant.

After the drill bit 23 has entered the workpiece, as at C of FIG. 19, the sensing device 162 produces an electrical signal proportional to the axial rate of movement of the drill mechanism 22. This output is fed to a voltage comparison circuit 322 where it is compared to a standard or reference voltage representative of what the voltage output of the device 162 would be if the forward speed of the drill carriage 71 were 6 inches per minute, for example. Whenever the input voltage is above the reference value, an error signal is produced which is amplified, and then converted to a pulse signal, such as by the generator 324 to fire the SCR230. Firing the SCR230 closes the current bypass circuit 205 which reduces the current flow through the solenoid coil 90 and the fluid flow to the motor unit 81 so as to maintain the reduced forward rate of the drill mechanism 22 to 6 inches per minute, for example. The SCR230 will cease firing when the rate of feed is below 6 inches per minute. By the "closed loop" arrangement (FIG. 16), a "hunting" action occurs resulting in a precise and constant low forward speed once such speed has reached 6 inches per minute, as seen at D of FIG. 20.

As the bit 23 cuts into the workpiece W, the drill mechanism 22 moves forwardly at such constant rate until load forces, such as chip buildup or the like, cause the rotational speed of the bit to be reduced. During this movement, the sensing device 54 continuously puts out a signal which is proportional to the rotational speed of the bit. When the amplitude of the signal falls below a predetermined threshold level at which the threshold level sensor 300 has been set, sufficient gate current will be provided in the conductor 308 to fire the SCR304 and energize the retract trigger circuit 302. Energization of the circuit 302 actuates the solenoid coil 90 mechanism 86 which is connected to the retract circuit 206 to deenergize the forward holding circuit 290. This moves the spool valve 92 mechanism 86 to the full open reverse position to allow fluid flow in the cylinder 82 so as to retract the drill mechanism 22 at a rapid rate, such as 500 inches per minute, as seen at E of FIG. 19. As the drill bit 23 moves away from the workpiece, the limit switch 15a is actuated which again allows coolant and/or lubricant to be discharged onto the bit to lubricate and remove accumulated chips therefrom.

When the drill mechanism 22 has been moved to the full retracted position, the fast forward limit switch 14a is tripped by the cam 139 to initiate the next step, as at F of FIG. 19. Accordingly, all of the circuits and related components are again actuated in the same manner for the next drilling step. As the position indicator 146 remains at the position where the drill mechanism 22 was retracted, the mechanism 22 again travels toward the workpiece W at a rapid rate, such as 500 inches per minute, as at A' of FIG. 19, with the coolant and/or lubricant being discharged onto the bit 23 until the same is again approximately one-eighth of an inch from the depth of the hole at which the previous retraction occurred, as at B'. The same drilling steps then automatically take place, as at D', E' and F', until the drill bit 23 has reached the predetermined bottom of the hole, as at G to complete the drilling cycle. Accordingly, this forward and retracting action of the drill mechanism 22 continues until the drill bit penetrates to a predetermined depth with the time of each cycle being unpredictable dependent, for example, upon the type of material and the chip buildup.

When the bit 23 has reached the predetermined hole depth G, the limiting device 164 is actuated, opening the cycling maintenance circuit to 50 (FIG. 13). Actuation of the circuit 250 energizes the retract circuit 206 which causes the drill mechanism 22 to retract at rapid speed, such as 500 inches per minute. During this retractive movement, the follower device 142 pulls the position indicator 146 with it toward the full retracted position. In the full retracted position, the unlatch device 175 via the hook 176 acts to uncouple the position indicator 146 from the follower device 142 so that the position indicator 146 is then in position for beginning the next drilling operation for the next hole. In the full retracted position, the rapid-feed trigger circuit 280 is not actuated due to the cycling maintenance circuit 250 which was deenergized by a signal from the depth-limiting device 164.

In the full retracted position of the drill mechanism 22, a signal indicating completion of the hole may be transmitted to a tape reader (not shown) in the case of a fully automatic operation. Upon such completion signal, the reader may actuate the support table 14 so as to rotate the workpiece W with respect to the drill head assembly 20 for the next hole-drilling operation. Thus positioned, the reader may send a signal to the tape start circuit 268 which actuates the cycling maintenance circuit 250 for commencing the next cycling operation, as aforesaid.

In the event the drill bit 23 becomes worn after repeated usage, the pressure responsive device 61 (FIG. 7) may be actuated to cause retraction of the bit. For example, upon wear of the bit 23, the rotational speed of the same will not generally be reduced since the bit will not be cutting metal. As a result, the output of the sensing device 54 will not drop below the aforementioned threshold level to indicate withdrawal thereof. Accordingly, the device 61 senses excess back pressure on the bit 23 and actuates the trigger retract circuit 302 to cause retraction of the drill bit. Suitable means (not shown) may be electrically connected with the device 61 to turn off the apparatus after retraction of the bit 23 and to provide a visual or audible indication that the drill bit need be replaced. In addition, a manual retract switch 253 (FIG. 14) may be disposed in the circuit 250 so that the drill mechanism 22 may be retracted at any time during the drilling cycle, as desired.

I claim:

1. A drilling apparatus for drilling one or more holes in a workpiece comprising,
   a frame,
   a drill mechanism including a drill bit supported on said frame for movement relative to said workpiece,
   drive means for rotating and for moving said drill bit axially toward and away from said workpiece,
   control means operably associated with said drive means for moving said drill bit at least at one predetermined rapid-feed rate prior to engagement with said workpiece and at a predetermined, relatively slower, substantially constant cutting feed rate during engagement with said workpiece,
   sensing means for determining the axial feed rate of said drill bit during cutting coacting engagement with said workpiece,
   feedback means operably associated with said sensing means being adapted to produce an output signal related to said predetermined cutting feed rate and the actual feed rate of said drill bit during said cutting coacting engagement with said workpiece, and
   said control means arranged to actuate said drive means in response to said output signal of said feedback means to move and maintain said drill bit at said predetermined, substantially constant, cutting feed rate.

2. In a drilling apparatus in accordance with claim 1, wherein said drive means includes,
   a fluid pressure motive means adapted for moving said drill bit with more than one predetermined axial feed rate toward and in cutting coaction with said workpiece and for retracting said bit at a predetermined rate away from said workpiece.

3. In a drilling apparatus in accordance with claim 2, wherein said motive means includes,
   a reciprocal fluid pressure motor unit, and
   control valve means for regulating the flow of fluid pressure to said motor unit from a supply source.

4. In a drilling apparatus in accordance with claim 3, including
   electrical control means operably associated with said control valve means for controlling reciprocal movement of said motor unit in response to the rate of rotation of said drill bit.

5. In a drilling apparatus in accordance with claim 1, wherein said control means includes,
   first switch means operably associated with said drive means for moving said drill bit axially toward said workpiece at a relatively high predetermined rate of speed.

6. In a drilling apparatus in accordance with claim 5, wherein said control means includes,
   second switch means operably associated with said drive means for automatically reducing said predetermined speed rate to a relatively lower predetermined rate of axial speed and at a predetermined distance from said workpiece.

7. In a drilling apparatus in accordance with claim 1, including depth control means operably associated with said drive means for automatically retracting said drill bit from cutting coaction with said workpiece after forward movement of said bit to a predetermined depth in said workpiece.

8. In a drilling apparatus in accordance with claim 1, including service means operably associated with said drill mechanism for automatically delivering a cooling and/or lubricating media to said drill bit in response to movement thereof toward and away from said workpiece.

9. A control system including a servomechanism for controlling movement of a drill mechanism with respect to a workpiece comprising, a primary control circuit adapted to be connected to a source of electrical power, said servomechanism electrically connected with said primary control circuit for actuating a drill mechanism, said primary control circuit including a first circuit electrically connected to said servomechanism for moving said drill mechanism in a forward direction at one feed rate, a second circuit electrically connected to said servomechanism for moving said drill mechanism in a forward direction at another feed rate, a first switching means operably connected to said drill mechanism, said switching means sequentially electrically connecting said first and second circuits to said servomechanism, a third circuit electrically connected to said servomechanism, a second switching means electrically connected to said third circuit to energize said third circuit for moving said drill mechanism at still another forward feed rate, feedback means operably connected to said drill mechanism and electrically connected to said third circuit and said switching means, and said feedback means being responsive to the feed rate of said drill mechanism to automatically actuate said switching means and to energize said third circuit to maintain a relatively constant forward feed rate of said drill mechanism.

10. A control system including a servomechanism for controlling movement of a drill mechanism with respect to a workpiece comprising, a primary control circuit adapted to be connected to a source of electrical power, said servomechanism electrically connected with said primary control circuit for actuating a drill mechanism, said primary control circuit including a first circuit electrically connected to said servomechanism for moving said drill mechanism in a forward direction at one feed rate, a second circuit electrically connected to said servomechanism for moving said drill mechanism in a forward direction at another feed rate, a first switching means operably connected to said drill mechanism, said switching means sequentially electrically connecting said first and second circuits to said servomechanism, a third circuit electrically connected to said servomechanism, a second switching means electrically connected to said third circuit to energize said third circuit for moving said drill mechanism at still another forward feed rate, a fourth circuit operably connected to said first, second and third circuits, and electrically connected to said switching means for predetermined deenergization of said first, second and third circuits, and retract signal means electrically connected with said fourth circuit to provide a signal to energize said fourth circuit when the rotational speed of said drill mechanism changes relative to a predetermined speed.

11. A control system including a servomechanism for controlling movement of a drill mechanism with respect to a workpiece comprising, a primary control circuit adapted to be connected to a source of electrical power, said servomechanism electrically connected with said primary control circuit for actuating a drill mechanism, said primary control circuit including, a first circuit electrically connected to said servomechanism for moving said drill mechanism in a forward direction at one feed rate, a second circuit electrically connected to said servomechanism for moving said drill mechanism in a forward direction at another feed rate, a first switching means operably connected to said drill mechanism, said switching means sequentially electrically connecting said first and second circuits to said servomechanism, and speed-responsive retraction means operably connected to said drill mechanism and electrically connected to said primary circuit to move said drill mechanism away from a workpiece.

12. A drilling apparatus in accordance with claim 1, including another sensing means operably associated with said drive means for retracting said drill bit from cutting coaction with said workpiece in response to reduction in the rate of rotation of said drill bit.

13. A drilling apparatus in accordance with claim 1, wherein said sensing means comprises a tachometer generator operably mounted on said drill mechanism for producing an output signal proportional to the axial speed of said drill bit.

14. A drilling apparatus in accordance with claim 12, wherein said another sensing means comprises a tachometer generator operably connected to said drill bit adapted to produce an output signal proportional to the rotational speed of said drill bit.

15. A drilling apparatus in accordance with claim 1, including pressure-responsive sensing means operably connected to said drill bit for sensing the axial pressure on said drill bit during cutting coaction with said workpiece, and said pressure-responsive sensing means including a switching device arranged to be actuated upon application of an axial pressure on said drill bit in excess of a predetermined pressure to retract said drill bit from said workpiece.

16. A drilling apparatus in accordance with claim 1, wherein said drill mechanism is pivotally mounted on said frame for pivotal movement of said drill bit about a generally horizontal axis.

17. A drilling apparatus in accordance with claim 1, wherein said control means include a servomechanism for controlling the movement of said drill mechanism with respect to said workpiece, a primary control circuit adapted to be connected to a source of electrical power, said servomechanism electrically connected with said primary control circuit for actuating said drill mechanism, said primary control circuit including a first circuit electrically connected to said servomechanism for moving said drill mechanism in a forward direction at one feed rate, a second circuit electrically connected to said servomechanism for moving said drill mechanism in a forward direction at another feed rate relatively slower than said one feed rate, a first switching means operably connected to said drill mechanism, and said switching means sequentially electrically connecting said first and second circuits to said servomechanism.

18. A drilling apparatus in accordance with claim 17, wherein said servomechanism includes a current-responsive servo member, said servo member electrically connected to said primary control circuit, and said second circuit having a greater resistance than said first circuit.

19. A drilling apparatus in accordance with claim 17, including a third circuit electrically connected to said servomechanism, and a second switching means electrically connected to said third circuit to energize said third circuit for moving said drill mechanism forwardly at said predetermined cutting feed rate upon cutting coacting engagement of said drill bit with said workpiece.

20. A drilling apparatus in accordance with claim 19, wherein said feedback means is operably connected to said drill mechanism and electrically connected to said third circuit and said switching means, and said feedback means being responsive to automatically actuate said switching means and to energize said third circuit to maintain a relatively constant forward feed rate during cutting coaction of said drill bit with said workpiece.

21. A drilling apparatus in accordance with claim 19, including a fourth circuit operably connected to said first, second and third circuits, and electrically connected to said switching means for predetermined deenergization of said first, second and third circuits.

22. A drilling apparatus in accordance with claim 21, wherein said another sensing means being electrically connected with said fourth circuit to provide a signal output to energize said fourth circuit when the rotational speed of said drill mechanism changes relative to a predetermined speed.

23. A drilling apparatus in accordance with claim 1, including a support column extending from said frame, at least one drill head assembly depending from said support column for pivotal movement about a generally horizontal axis, said drill head assembly including a drill control mechanism, and said drill mechanism operably mounted on said drill head assembly being disposed for axial movement relative to said drill control mechanism toward and away from said workpiece.

24. A drilling apparatus in accordance with claim 23, including means for rotating said drill head assembly about a generally vertical axis, and means for rotating said workpiece on said frame.

25. A drilling apparatus in accordance with claim 23, including a pair of said drill head assemblies mounted on and depending from opposed sides of said support column each including a drill mechanism for independent or simultaneous drilling operation with respect to said workpiece or workpieces.

* * * * *